United States Patent [19]

Yamamoto et al.

[11] Patent Number: 4,600,076

[45] Date of Patent: Jul. 15, 1986

[54] DEVICE FOR ATTENUATING PULSATION OF FLUIDS IN PIPING SYSTEMS

[75] Inventors: Shizuo Yamamoto, Tokyo; Tetsuo Kanda, Yokohama; Nobuaki Suzuki; Hiroyuki Matsuda, both of Kanagawa, all of Japan

[73] Assignee: Chiyoda Chemical Engineering & Con. Co., Ltd., Japan

[21] Appl. No.: 661,340

[22] Filed: Oct. 16, 1984

Related U.S. Application Data

[63] Continuation-in-part of Ser. No. 412,987, Aug. 30, 1982, abandoned.

[30] Foreign Application Priority Data

Sep. 9, 1981 [JP] Japan ............................. 56-140919

[51] Int. Cl.$^4$ ............................................. F16L 55/02
[52] U.S. Cl. ........................................ 181/233; 181/268; 181/281
[58] Field of Search ............... 181/233, 227, 228, 234, 181/236, 268, 270, 281

[56] References Cited

U.S. PATENT DOCUMENTS

| | | | |
|---|---|---|---|
| 1,877,567 | 9/1932 | Erbes | 181/233 X |
| 3,061,039 | 10/1962 | Peters | 181/233 |
| 4,310,067 | 1/1982 | Thomson | 181/228 |

*Primary Examiner*—Benjamin R. Fuller
*Attorney, Agent, or Firm*—McGlew and Tuttle

[57] ABSTRACT

A device for attenuating pulsation of a fluid in a piping system comprises fluid-branching pipes extending from the piping system in which there are pulsation waves, and a plurality of orifice elements and a plurality of discs disposed in a dispersed fashion and having a small reflection factor of the pulsation wave and having a total friction factor greater than that of the entire piping system, thereby providing the effect of attenuating the pulsation of the fluid within the system without increasing the resistance of the piping system without increasing power consumption.

5 Claims, 5 Drawing Figures

DEVICE FOR ATTENUATING PULSATION OF FLUIDS IN PIPING SYSTEMS

This is a Continuation-in-Part of application Ser. No. 412,987, filed on Aug. 30, 1982, now abandoned.

BACKGROUND OF THE INVENTION

The present invention relates to an armature equipment included in a piping system, and more particularly to a device which is specifically adapted to attenuate pulsation of a fluid passing through the piping system equipped with the armature which is likely to be the source of pulsation in pumps, compressors, and like, of the equipment.

In the piping system of an industrial plant, there is generally provided such armature equipment as pumps, compressors, fuel burners, flow meters, etc., which are in practice likely to become a source of pulsation. In the construction of the piping system, particularly, in which there is incorporated a reciprocating compressor or compressors which become a source of pulsation to the system, there would occur a resonance when the characteristic frequency of a fluid passing through the piping system and that of the source of pulsation are so close to each other, that such a condition would naturally result in an undesirable variety of problems such as a reduction in the efficiency of the compressor, damage to armatures or other parts in the piping system due to the resultant vibratory motion thereof, etc.

In coping with this problem, there have been proposed various countermeasures for the prevention of such undesirable problems of pulsation in the piping system. More specifically, some practiced countermeasures are: (a) providing different characteristic frequencies of such sources of pulsation and of the fluid passing through the piping system by changing the effective length of the piping system; (b) providing an orifice constriction in the way of the piping system to absorb the pulsating energy in the form of fluid friction when passing therethrough; (c) providing a surge tank in the piping system; (d) providing branch-off piping in the system; (e) providing a surge tank at the leading end of such branch-off piping, and the like.

Despite the provision of such countermeasures in practice, however, in the case of (a) above, when the frequency of the source of pulsation changes and/or when the properties of the fluid changes, the problem of resonance would again disadvantageously occur, and in the case of (b), the provision of such an orifice or orifices within the piping system would be an obstacle not only for the pulsation wave, but also for the non-pulsating or constant streams in the system, thus resulting in an increase in power consumption of the pump units, compressors, etc. In the case of (c), a surge tank of a substantial capacity is required, which means an increase in the manufacturing cost and also in the maintenance cost of the piping system, while in the case of (d), it is disadvantageous that the pulsation attenuating effect may be lost with the changes in the characteristic frequency of the pulsating source and in the properties of the fluid in the system. Finally, in the case of (e), there is also the drawback of high cost required for the provision of a surge tank.

BRIEF SUMMARY OF THE INVENTION

It is therefore a primary object of the present invention to provide an improved means for preventing the problem of pulsation in the piping system of an industrial plant by effecting changes in the characteristic frequency of the source of pulsation and/or in the properties of the fluid within the piping system.

It is another object of the present invention to provide an improved means for preventing the problem of pulsation in the piping system which can affect its performance without a substantial increase in the fluid resistance of the system.

It is still another object of the present invention to provide an improved means for preventing the problem of pulsation in the piping system which is simple in construction and low in production cost.

These and other objects of the invention may be attained with the provision of an improved pulsation attenuating device of the construction, as briefly summarized, which is comprised of fluid-branching pipes extending from the length of the piping system wherein pulsation occurs, a plurality of friction elements being arranged in a dispensed fashion within the fluid-branching pipes having as a whole a substantially small reflection factor against a pulsation wave within the piping system and having a greater sum of friction factor than that of the piping system.

DETAILED DESCRIPTION OF THE INVENTION

The principle of the present invention will now be described in detail by way of examples and a preferred embodiment thereof in conjunction with the accompanying drawings.

Figure 1:
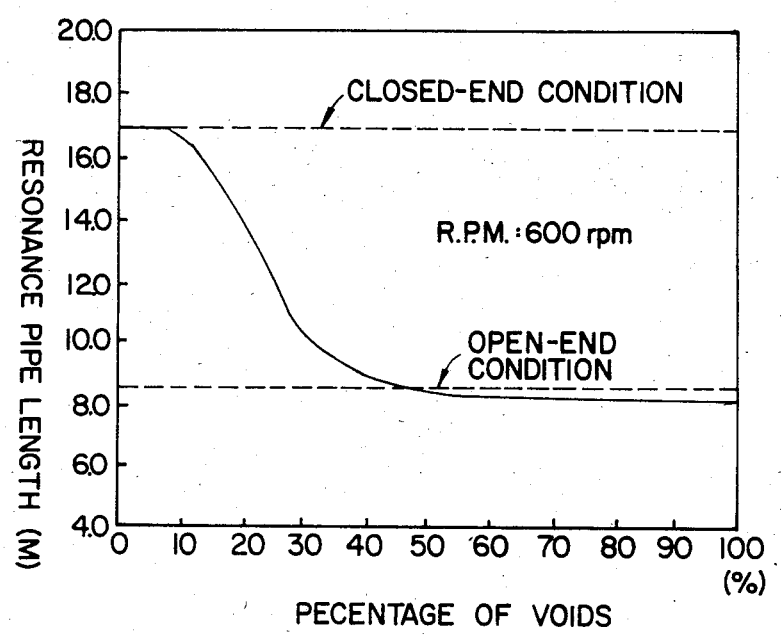
FIG. 1 is a graphic representation showing the open and closing conditions in the interior of the piping system when installed with an orifice or orifices therein.

When there exists a propagation of pulsation to the fluid within a piping system from a source of pulsation therein, two conditions can be observed. One is a closed-end condition where, with one end of the pipe closed, zero velocity of pulsation may eventually be reached. The other condition is an open-end condition where the end of the pipe in the piping system is open to the atmosphere or to connects with a large capacity tank. Under this condition a greater velocity of pulsation may appear. On the other hand, when the pipe end is neither closed completely nor opened thoroughly, for instance, as when provided with an orifice at the end thereof, either of the open-end or closed-end conditions as mentioned above may exist depending upon the extent of opening in the orifice. The general observation of such conditions may be seen in FIG. 1, which is taken from the Nihon Kikai Gakkai (Japan Machinery Society) Papers No. 2, Vol. 34, No. 268, P. 2140. More specifically, according to the graph, there exists the open-end condition in the piping system when it is open 40% or more, while there is the closed-end condition when it is open 40% or less, and it is observed that part of the pulsation wave is repulsed with the system being open 20 to 40%.

In this connection, it is also observed that a similar phenomenon exists with a piping system having a branch pipe extending outwardly therefrom, this branch pipe being provided with an orifice. With this orifice arrangement being 40% or more open, it can be observed that the pulsation wave is not deflected, hence providing no closed-end condition at all, but when the open-end condition does not reach this level, there exists the closed-end condition under which the pulsation wave is repulsed, thus resulting in the branch pipe provided in the system having no effect. Generally, it is an essential requirement for such means of friction as an orifice, or the like to have as small a repulsion factor as possible, preferably 10% or less.

However, in the case that an orifice plate open 40% or more is provided within the branch pipe for the purpose of avoiding the closed-end condition in the piping system, the orifice plate does not for instance supply the pulsation wave of fluid with the desired effect of friction, thus causing repulsion from the end of the branch pipe, resulting ultimately in a reduced effect of pulsation attenuation.

In this respect, for attaining a due effect of attenuating the pulsation of the fluid within the piping system, it is essential to provide the entire branch pipe with a sufficient coefficient of friction against the pulsation wave.

Referring to the internal friction of the branch pipe against the pulsation wave of a fluid, when a branch pipe is provided in the proximity of a reciprocating compressor, the branch pipe may be arranged such that a straight pipe is connected immediately with the piping system, wherein the acoustic impedance Zt of the entire piping system including the branch pipe can be expressed by the following equation:

$$1/Zt = 1/Za + 1/Zb$$

in which Za is the impedance of the piping system and Zb is the acoustic impedance of the branch pipe. According to this equation, it is necessary to have the value of Zt very low for the purpose of preventing the occurrence of a pulsation in the piping system, and for this purpose, it is essential to have the acoustic impedance value of Zb of the branch pipe very low. The maximum value of the acoustic impedance Z is in inverse proportion to the acoustic damping caused by the friction factor $\xi$ of the pulsation wave. Consequently, in order to make the value Zb very low, the friction factor $\xi$ of the branch pipe may accordingly be made greater. The friction factor $\xi$ is of a value as in the following equation:

$$\Delta P = \xi \cdot \rho V^2 / 2g$$

in which $\Delta P$ is the pressure drop, $\xi$ is the friction factor, $\rho$ is the density of the fluid, v is the pulsation particles velocity and g is the apparent gravity.

In the equation $$1/Zt = 1/Za + 1/Zb$$

when the value of Zb is greater than the value of Za, as it is impractical to have the value of Zt too low even with the employment of the branch pipe, it is essential for the value Zb to be made lower than the value Za, and then it is also essential to have the value of friction factor $\xi b$ of the branch pipe substantially greater than that of the piping system $\xi a$.

For instance, in order to prevent the occurrence of a pulsation by providing an orifice in the branch pipe, the employment of a single orifice plate being open 40% or more is insufficient, and in order to have the value $\xi b$ greater as desired, it is desirable to have ten or more orifice plates with large openings installed in position at intervals from one another as means of acoustic damping caused by friction.

With this arrangement, since there exists an closed-end condition from the substantial reduction in the opening of these acoustic damping means when installed together at one place for the purpose of attaining an increased friction factor of the means of acoustic damping within the branch pipe, it is an advantage of the present invention to provide such a construction that these means of acoustic damping be located in a dispersed fashion over a relatively wide range of locations for the avoidance of such undesired effect, yet providing a greater friction factor of the entire branch pipe than that of the piping system.

Next, a detailed description will be made of the embodiments of the present invention in conjunction with the accompanying drawings.

Figure 2:
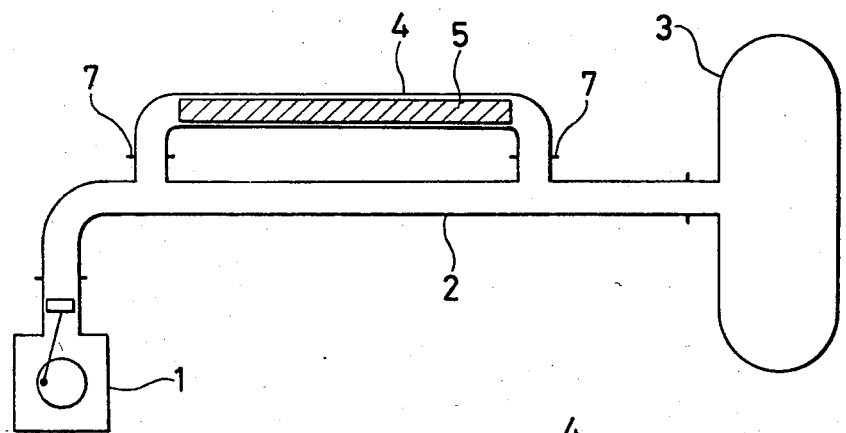
FIGS. 2 and 3 are a schematic view showing the general arrangement of the piping system incorporating a fluid-branching pipe according to the present invention.

FIG. 2 is a schematic view showing the general arrangement of the piping system, wherein this particular piping system is shown comprising a reciprocating compressor 1, a length of piping 2 and a surge tank or a reactor 3, and wherein it is assumed there is occurring a pulsation within the piping 2 from the reciprocating compressor 1, the source of pulsation in the system. There is also shown a fluid-branching pipe 4 provided on the piping 2 by way of a joint flange 7, in such a mannner that they all together form a substantial bypass route in the piping system. Also, a body of acoustic damping 5 is provided which comprises, for instance, a plurality of orifice elements and/or a plurality of discs in the interior of the branch pipe 4. While it is preferred to have the branch pipe 4 attached to the piping 2 in the proximity of the reciprocating compressor 1, this is not essential, and hence, it may be located at any other place to provide equally satisfactory effects in operation.

On the other hand, in the relationship of the cross-sectional areas of the joint section between the fluid branching pipe 4 and the piping 2, it is preferable that the cross-sectional area of the fluid branching pipe 4 be designed to be 40% or more of that of the piping 2, preferably 50% or more in practice.

While the longer the fluid branching pipe 4 is the better, from the standpoint of attenuating the pulsation alone, it is sufficient in the practical design that it have a length of one-fourth or more of the wavelength of an existing pulsating motion, more practicably with a length of one-sixteenth of the pulsation wavelength acceptable in use.

Figure 3:
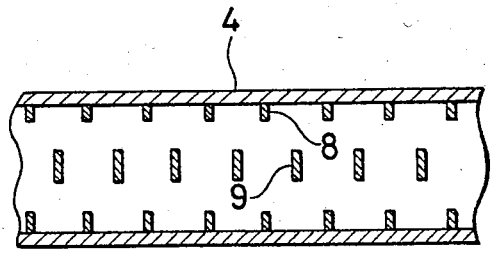

Referring to FIG. 3, there is shown an examplary arrangement of the invention wherein there are provided in combination a plurality of orifice elements 8 being open 40% or more and a plurality of discs 9 being open 40% or more arranged in a staggered or alternating fashion with each other as being the working means of acoustic damping in the interior of the fluid branching pipe 4. In practice, it is also feasible that a plurality of orifice elements 8 or discs 9 be provided at appropriate intervals from one another in position within the fluid branching pipe 4.

It is not necessary that the fluid branching pipe be made straight. It may be either curved or bent as the case may be.

Furthermore, according to the pulsation attenuating device of this invention, there may not necessarily be provided a single fluid branching pipe, but a plurality of them may be provided as desired so that a substantial improvement in the efficiency of operation can be obtained. Also, in the case where there is only a limited space to install the fluid-branching pipe in a proper position of the system, it is possible in practice to provide an inner pipe or pipes within the piping system in the form of a dual pipe construction as shown in FIG. 4, there being means of acoustic damping either in the interior of the inner pipe or pipes or between the inner pipe and the outer piping system.

Figure 4:
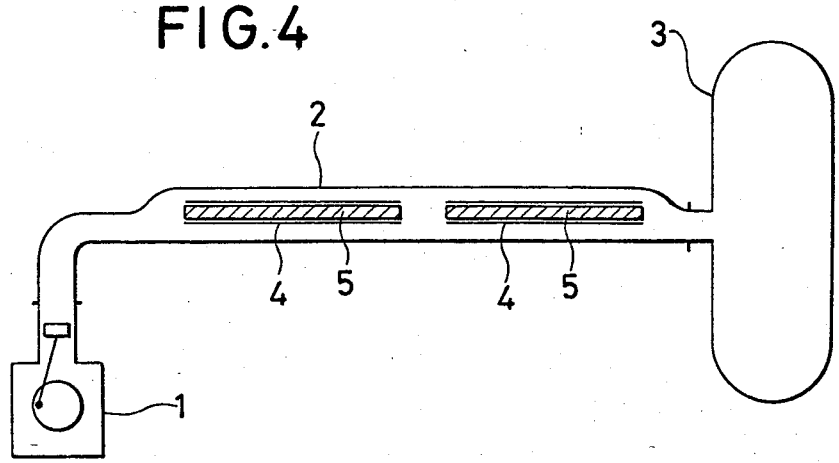
FIG. 4 is fragmentary cross-sectional views showing a variance of fluid-branching pipes of the pulsation attenuating device according to the present invention.

The branching pipes in FIGS. 2 and 4 are parallel to the piping 2 and have an inlet connected at one point to the piping and an outlet connected at another point to the piping which is spaced from the inlet. The piping 2 and branching pipes 4 may be straight as shown in FIGS. 2 and 3.

Figure 5:
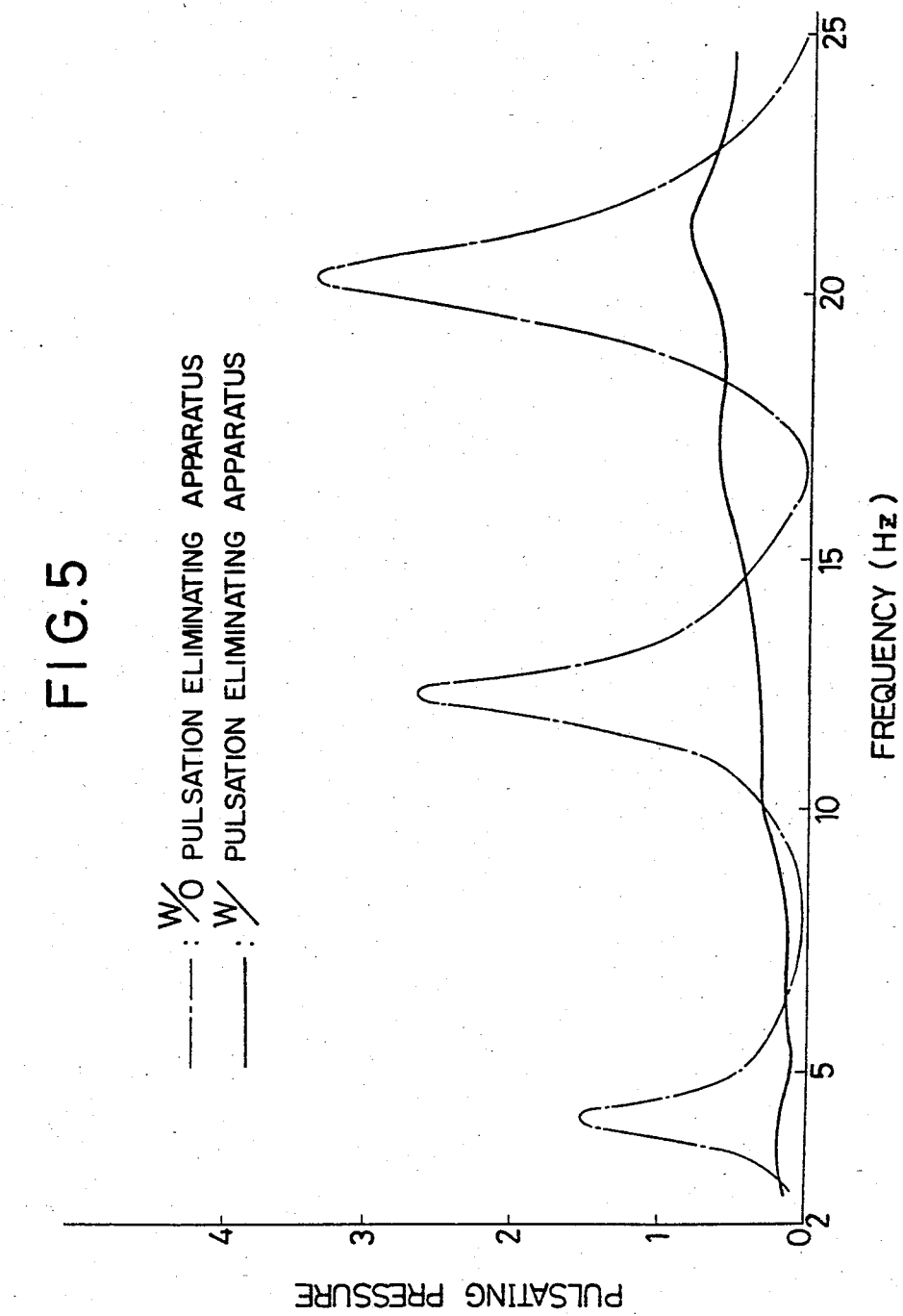
FIG. 5 is a graphic representation showing the advantageous effect of pulsation attenuation as attained with the improved device according to the present invention.

Referring to the effect and function of the arrangement according to the present invention, the invention will now be reviewed by way of a typical embodiment thereof as follows:

The following are the results obtained through a series of tests conducted to observe in comparison the occurrence of pulsation in a piping system which comprises a straight pipe 23 m long and having an inner diameter of 2 inches (approx. 50 mm), a reciprocating type compressor mounted at one end of the length of the straight pipe and leaving the other end thereof open to the air, under either of the conditions where the pulsation attenuating apparatus of the present invention is incorporated and where it is not. The test results are shown in FIG. 5. In FIG. 5, the curve in broken line represents pulsation pressure amplitude in the case where there was provided no pulsation attenuating apparatus, and in this arrangement it was observed that when the revolutions of the reciprocating compressor were changed selectively, and when the length of the straight pipe was made one-fourth, three-fourths, five-fourths . . . etc. of the current wavelength of the pulsation wave, there occurred a resonance, which accordingly made the pulsation pressure amplitude greater.

There was further provided a fluid branching pipe having an inner diameter of 2 inches (approx. 50 mm) and a length of 8 m on the piping system in the proximity of the reciprocating compressor, with orifices providing a percentage of opening area of 50% in the fluid branching pipe. The solid curve in FIG. 5 represents the state of pulsation pressure amplitude in the piping system. In the case where there was provided the pulsation attenuating apparatus of the present invention, as shown typically with the solid curve in the graphic representation, it was observed that the maximum value of the pulsation pressure amplitude of the fluid within the piping system decreased remarkably to as little as approx. 25% of that of the case where no pulsation attenuating apparatus was present in the system. As a consequence, the pulsation attenuating apparatus according to the present invention efficiently attenuates a pulsation pressure amplitude, even if the frequency of the source of pulsation or the acoustic velocity of the fluid changes, thus making it possible to hold the pulsation pressure amplitude in the entire piping system at a substantially low level in practice.

As fully explained hereinbefore, in the construction of the conventional art in the piping system per se, there are provided certain acoustic damping means adapted to attenuate the palsation of the fluid within the piping system so as to have an increased friction factor thereof and the like, thereby absorbing the pulsating energy in the form of fluid friction when passing therethrough. However, with such a construction incorporating such acoustic damping means within the piping system, it becomes a substantial obstacle not only for the pulsation wave of a fluid within the piping system, but also for non-pulsating or constant streams in the system, thus resulting in an increase in power consumption of the pump units, compressors, etc. in the system. By contrast, with the pulsation attenuating apparatus of the present invention, by virtue of the specific arrangement wherein there are provided suitable acoustic damping means in the fluid branching pipes provided in the piping system, and wherein the non-pulsating flow velocity of the fluid is optionally made very small, and wherein the branch pipe is specifically designed to bring an appropriate flow resistance against only the pulsation wave of the fluid existing therein, it is possible in practice that no substantial resistance effect be applied on non-pulsating streams of the liquid within the piping system, and consequently an efficient effect of attenuating the pulsation of the liquid is made available by means of a relatively simple construction, and yet one which is free from any substantial increase in the power consumption of the system.

While the invention has been described with reference to these preferred embodiments, it is to be understood that the present invention is not in any way restricted in detail to those described and/or illustrated, and that changes may be made therein without departing from the scope of the invention which is defined in the appended claims.

What is claimed is:

1. A device for attenuating pulsation waves occurring in a piping system and caused by a fluid passing through a length of the piping system, which device comprises (a) at least one fluid branching pipe communicating with said piping system at a plurality of positions thereof for passing a partial flow of said fluid, and returning said partial flow to said fluid through through said fluid branching pipe, said fluid branching pipe having flow passage zones which are separated acoustically from said piping system except for said plurality of positions, and (b) acoustic damping means comprising a plurality of orifice means and/or disc means having an overall percentage of opening area of 40% or more in said fluid branching pipe, said fluid branching pipe being thus open for passage of fluids.

2. A device according to claim 1, wherein said piping system includes a straight length of piping, said fluid branching pipe being parallel to and spaced laterally of said straight length of piping, said fluid branching pipe having an inlet connected to said piping at a first point and an outlet connected to said piping at a second point which is spaced from said first point.

3. A device according to claim 1, wherein said piping system includes a straight length of pipe, said fluid branching being disposed in said straight length of pipe and having an inlet communicating with said straight length of pipe at a first point and an outlet communicating with said straight length of pipe at a second point which is spaced from said first point.

4. A device according to claim 2, wherein the pulsation waves to be attenuated have a certain wavelength, the length of said fluid-branching pipe being at least one sixteenth of the wavelength.

5. A device according to claim 3, wherein the pulsation waves to be attenuated have a certain wavelength, the length of said fluid-branching pipe being at least one sixteenth of the wavelength.

* * * * *